(12) United States Patent
Gillham et al.

(10) Patent No.: US 6,363,191 B1
(45) Date of Patent: Mar. 26, 2002

(54) SINGLE-SIDED FIBER OPTIC SPLITTER WITH INTEGRAL MINIATURE BEND

(75) Inventors: Frederick J. Gillham, Westborough; Thomas R. Ouellette; David W. Stowe, both of Milford, all of MA (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/379,932

(22) Filed: Aug. 24, 1999

Related U.S. Application Data

(60) Provisional application No. 60/097,822, filed on Aug. 25, 1998, and provisional application No. 60/097,773, filed on Aug. 25, 1998.

(51) Int. Cl.[7] .............................. G02B 6/26; G02B 6/42; G02B 6/02
(52) U.S. Cl. ............................. 385/48; 385/31; 385/123
(58) Field of Search .......................... 385/27, 32, 123, 385/31, 39, 43, 48, 4; 250/227.21; 359/237

(56) References Cited

U.S. PATENT DOCUMENTS

| | | | | |
|---|---|---|---|---|
| 5,138,676 A | * | 8/1992 | Stowe et al. | 385/32 |
| 5,452,393 A | * | 9/1995 | Stowe et al. | 385/123 |
| 5,699,461 A | * | 12/1997 | Minemoto et al. | 385/12 |
| 5,883,992 A | * | 3/1999 | Gonthier | 385/43 |
| 6,008,927 A | * | 12/1999 | Minemoto et al. | 359/245 |

* cited by examiner

Primary Examiner—Frank G. Font
Assistant Examiner—Michael P. Mooney
(74) Attorney, Agent, or Firm—Weingarten, Schurgin, Gagnebin & Lebovici LLP

(57) ABSTRACT

An optical assembly has a miniature fiber optic bend fixedly attached to a substrate to form an integral assembly with an optical component also fixedly attached to the substrate. The assembly includes at least one optical fiber having an entering fiber portion and a return fiber portion. A miniature bend is formed in an intermediate portion that comprises an optical fiber portion between the entering fiber portion and the return fiber portion to provide a reversal of direction between the entering fiber portion and the return fiber portion. The entering fiber portion and the return fiber portion are preferably fixed in overlying relationship within a channel formed in the substrate. The resulting device is smaller, more environmentally stable, and more robust, because there is no relative motion between components. The resulting device also has fewer parts and processing steps to manufacture.

15 Claims, 4 Drawing Sheets

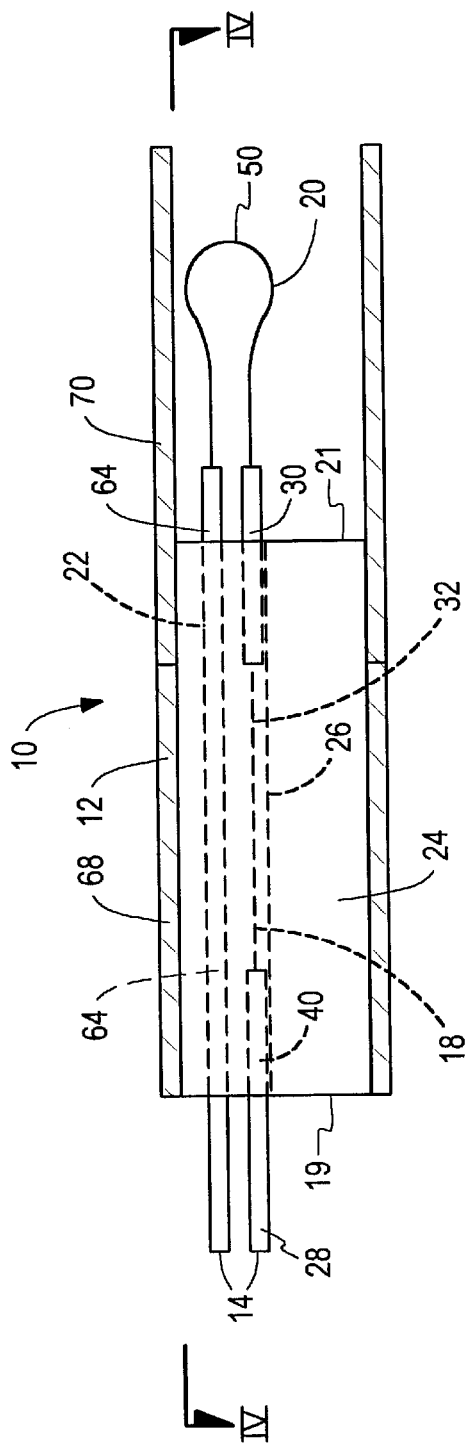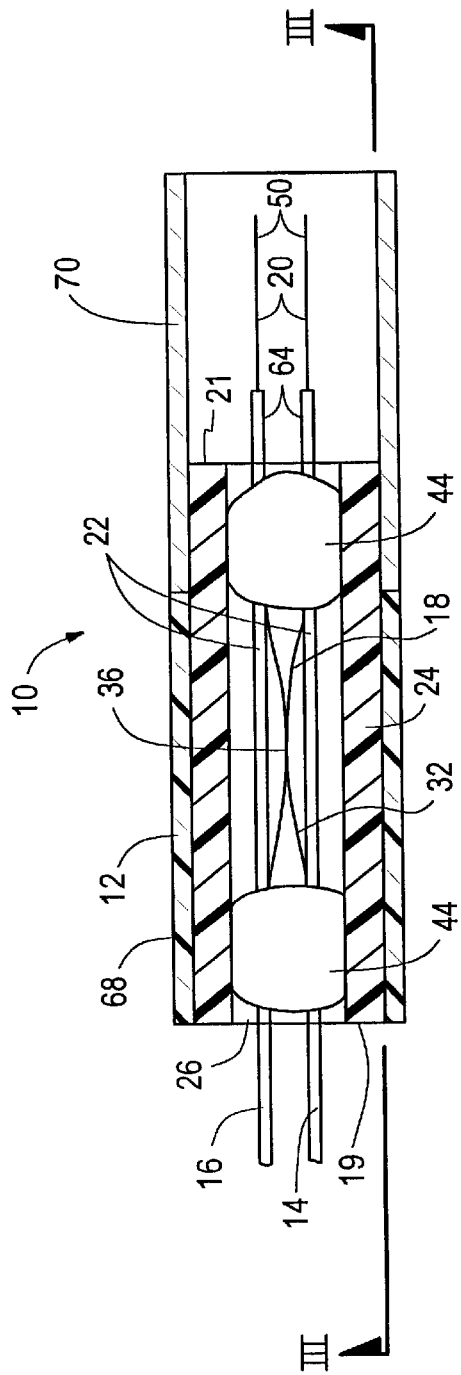

SINGLE-SIDED FIBER OPTIC SPLITTER WITH INTEGRAL MINIATURE BEND

CROSS REFERENCE TO RELATED APPLICATIONS

This application claims the benefit under 35 U.S.C. §119 (e) of U.S. Provisional Application Nos. 60/097,822, filed on Aug. 25, 1998, and 60/097,773, filed on Aug. 25, 1998, the disclosures of both of which are incorporated by reference herein.

This application is related to a commonly assigned application by the same inventors entitled Asymmetrical Miniature Bends in Optical Fiber and Method of Forming Same, filed concurrently herewith, the disclosure of which is incorporated by reference herein.

STATEMENT REGARDING FEDERALLY SPONSORED RESEARCH OR DEVELOPMENT

N/A

BACKGROUND OF THE INVENTION

Fiber optic splitters or couplers are commonly packaged by mounting fused fibers in or on a supporting substrate. Referring to FIG. 1, the fibers have their protective polymer coating removed in a central region of about 2 cm in length. The fibers are fused together in this region to cause a coupling of optical energy (light) between the two fibers. The resulting assembly is quite delicate, because the unprotected optical fibers are exposed in the fusion region, which may have a diameter as small as 20 microns.

To protect the fused fiber assembly, the fibers may be mounted in a protective substrate or package. In one typical example, the fused fibers are placed in a slot in the substrate. The slot forms a protective wrap partially encompassing the fused fibers, which are glued or epoxied within the slot near each end. In the center of the substrate the fibers are freely suspended to avoid optical contact with the substrate or the glue, which would degrade the optical performance of the device. The substrated coupler assembly may then be encased in a polymer tube to provide protection from airborne contaminants during further packaging. This assembly may then be placed inside a tube, such as of stainless steel, to provide final mechanical protection. In this type of splitter, fibers emerge from both ends of the package.

To form a single-sided splitter or coupler, in which fibers enter and exit from one side of the package, it is necessary to turn the fibers back upon themselves to reverse their direction. To avoid light loss and maintain a useful longevity in an unprocessed bent fiber, the turn typically requires a bend radius of 2 cm or more. This radius may be substantially reduced to as little as $50\mu$ using miniature bends. To form a miniature bend, the diameter along a length of bare fiber is reduced to as little as $1\mu$ or less, by for example drawing, etching, or a combination thereof. In the reduced diameter region, the fiber conducts light by internal reflection at least partially due to the difference in index of refraction at the interface between the fiber and the surrounding environment, generally air. Thus, in this region, the fiber may be bent with no substantial light loss from the bend. See U.S. Pat. Nos. 5,138,676 and 5,452,383, the disclosures of which are incorporated by reference herein.

FIG. 2 illustrates a device in which a miniature bend is packaged within a protective shield or capsule that is closed at one end. In this device, the shield also functions as a strength member to which the miniature bend is mounted to isolate it from external stresses. Adhesive must be inserted inside the shield to bond the fiber leads to the shield, a tedious and exacting process.

Another disadvantage of single-sided splitters or couplers or other components that may utilize known prior art miniature bends is that separate elements must be used, one for the component and one for the bend. Space must be provided between the component and the bend to allow for fabrication of each, resulting in a device that is significantly longer than the component and the bend individually. The device is also less environmentally stable, because the individual component and the bend can move relative to each other, causing additional stress on the fibers.

BRIEF SUMMARY OF THE INVENTION

The present invention provides a fiber optic assembly in which a fiber optic component and a miniature bend are mounted in an integral assembly. The resulting assembly is shorter, more environmentally stable and more robust, because there is no relative motion between components. The resulting device also has fewer parts and processing steps to manufacture.

More particularly, the present invention provides a fiber optic assembly comprising a fiber optic component and a miniature bend fixedly mounted to a substrate. The component comprises at least one optical fiber having an entering fiber portion and a return fiber portion. A buffer covers at least a portion of the return fiber portion and of the entering fiber portion. The bend is formed in an intermediate portion that comprises a bared optical fiber portion between the entering fiber portion and the return fiber portion to provide a reversal of direction between the entering fiber portion and the return fiber portion. The bend is fixedly mounted to the substrate.

In a particular embodiment, the fiber optic component comprises a fiber optic splitter or coupler. Two fibers enter the component from one side. On the other side, two miniature bends are formed to fold the two fibers back upon themselves. The two fibers then exit the component from the same side that they entered. More specifically, entering fiber portions are fixedly mounted within a channel in a substrate by glue or epoxy bonds near the channel ends. Bared fiber portions of the entering fiber portions are fused together in a central fusion region suspended within the channel between the glue bonds to form the splitter or coupler. A further region of bare fibers is provided outside the opposite side of the substrate. The miniature bend is formed in this further region to cause the fibers to reverse direction and extend back upon themselves. Buffered return fiber portions are laid in the channel of the substrate over the entering fiber portions and the fusion region and are fixed above the entering fiber portions by a bond of epoxy or glue over the glue bonds holding the entering fiber portions. The return fiber portions emerge from the substrate directly above the entering fiber portions. In this manner, the miniature bend is rigidly attached to the same structural supporting member, the substrate, as the fusion region, resulting in a construction having stability, rigidity and compact size.

DESCRIPTION OF THE DRAWINGS

The invention will be more fully understood from the following detailed description taken in conjunction with the accompanying drawings in which:

FIG. 3 is a cross-sectional side view taken along line III—III of FIG. 4 of an integral single-sided fiber optic splitter and miniature bend according to the present invention;

FIG. 4 is a cross-sectional plan view taken along line IV—IV of FIG. 3;

DETAILED DESCRIPTION OF THE INVENTION

Figure 1:
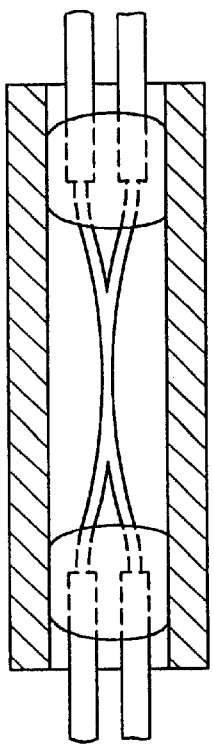
FIG. 1 illustrates a prior art fiber optic splitter.

FIGS. 3 and 4 illustrate a fiber optic component and miniature bend assembly 10 according to the present invention. In the embodiment illustrated, the component 12 is a 2×2 single-sided splitter or coupler. In the present invention, the terms splitter and coupler are used interchangeably. It will be appreciated that other fiber optic components may be used with the present invention. Two fibers 14, 16 each have an entering fiber portion 18, a miniature bend 20, and a return fiber portion 22 overlying the entering fiber portion 18. Each entering fiber portion 18 enters the component from one side 19. On the other side 21, the miniature bend 22 is formed in each fiber to fold the two fibers back upon themselves. Each return fiber portion 22 exits the component from the same side 19 that it entered.

More particularly, the assembly includes a substrate 24 of, for example, a rod of fused silica or quartz. A channel or slot 26 is sawn or drawn or otherwise formed in the substrate. The protective polymeric buffer 28, 30 of each of the two fibers is removed to leave a central region 32 of bare fiber. The bared central regions are fused together in a fusion region 36 as known in the art. The fused fibers may have been tapered by drawing or etching prior to or during the fusion process. The fusion process is stopped when the desired optical performance is achieved. The fused fibers then are placed in the channel 26 in the substrate 24 with buffered portions 40 extending beyond the sides 19, 21 and are fixed thereto by a bond 44 of epoxy or glue near each end of the channel. The bonds cover the interface between the buffers and the bared fibers. The bonds, however, do not extend into a central region of the channel 26, so that the fusion region 36 is suspended above the substrate to avoid contact with the bottom or sides of the substrate or with the glue, which would degrade the optical performance of the device.

Figure 5:
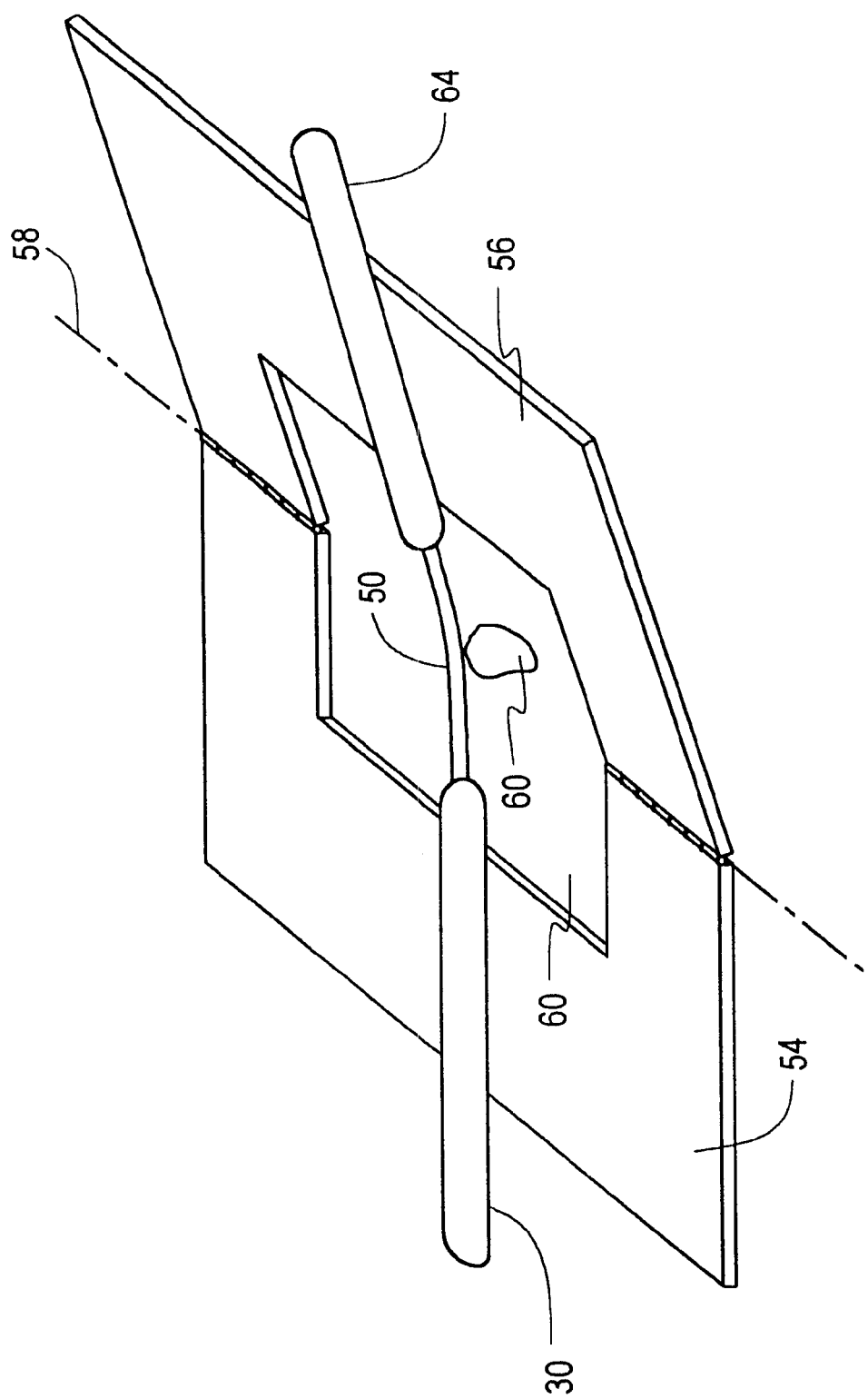
FIG. 5 illustrates a process for forming the miniature bend of the present invention.

As noted above, buffered portions 30 of the fibers extend past the opposite side 21 of the substrate. The buffer is removed from a further portion 50 of the fibers to leave a central region of bare fibers. The diameter of the central region is narrowed, for example, by drawing, etching, or a combination thereof, to an appropriate diameter to achieve a bend with minimum light loss, as known in the art. See U.S. Pat. Nos. 5,138,676 and 5,452,383. The central region is bent, using a suitable support, such as hinged plates 54, 56, illustrated in FIG. 5. The hinge axis 58 between the plates defines a fulcrum about which the central region of the fiber is bent. An opening 60 is provided in and between the plates to allow the central region 50 to be heated with a suitable heat source, such as a flame 62, if desired. The hinged plates are folded about the hinge axis to bend the fiber. In the embodiment illustrated, the fiber is bent approximately 180°. The particular bend angle, however, may be chosen as necessary for the particular application. Preferably, a straight, tapered transition region is left on each side of the bend between the diameter of the entering and return fiber portions and the reduced diameter of the bend. After bending, the return or folded-back fiber portions are laid in the channel 26 of the substrate 24 over the entering fiber portions 18 and the fusion region 36. Within the channel 26, the return fiber portions 22 are covered with the polymeric buffer 64, The return fiber portions 22 are fixed above the entering fiber portions by a bond of epoxy or glue over the glue bonds holding the entering fiber portions. The return fiber portions emerge from the side 19 of the substrate directly above the entering fiber portions 18. In this manner, the miniature bend 20 is rigidly attached to the same structural supporting member, the substrate 24, as the fiber optic component 12, resulting in a construction having stability, rigidity, and compact size.

The substrated assembly is preferably encased in a tube 68, of, for example, a polymer material, to provide protection from airborne contaminants during further packaging. A rigid protective shield 70 is placed over the end of the substrate from which the miniature bend 20 extends, to protect the bend from contact with other surfaces, which would degrade the optical performance of the fibers. This shield may be formed of any material, for example, stainless steel, that is sufficiently rigid to resist collapse against the bend. The shield may be fixed to the substrate in any suitable manner, such as with glue or epoxy. This package may be placed in further protective packaging, such as a stainless steel housing (not shown), if desired.

Figure 2:
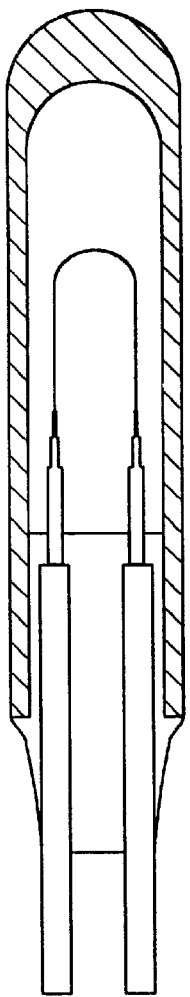
FIG. 2 illustrates a prior art 180° miniature bend.
Figure 6:
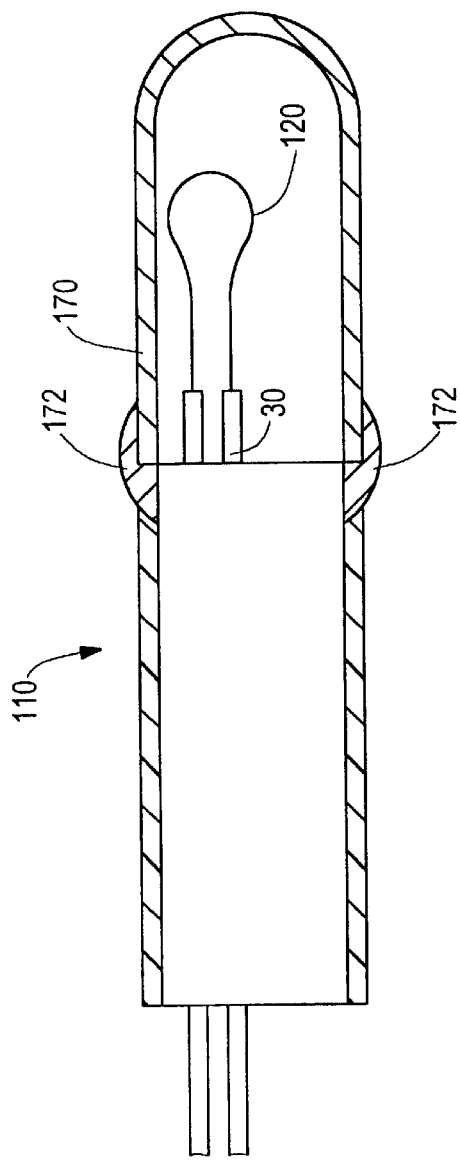
FIG. 6 is a cross-sectional side view of a further embodiment of a single-sided fiber optic splitter.

FIG. 6 illustrates a further embodiment of an integrated splitter and miniature bend assembly 110 in which a protective shield 170 encapsulates the miniature bend 120. The shield may be fixed to the substrate in any suitable manner, such as with bonds 172 of glue or epoxy. The shield protects the bend from contact with external items. The shield may be similar to the prior art shield illustrated with the discrete miniature bend in FIG. 2. The shield illustrated in FIG. 6, however, does not function as a strength member to isolate the bend from external stresses. Consequently, it is not necessary to insert adhesive inside the shield to bond the fiber leads to the shield.

Figure 7:
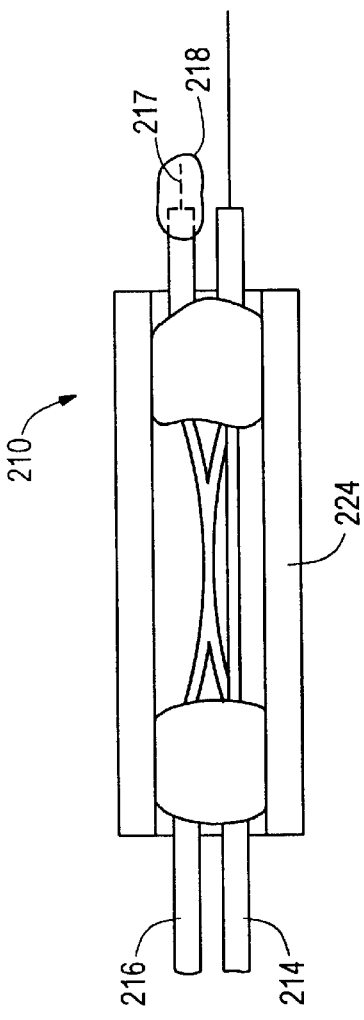
FIG. 7 is a side view of a still further embodiment of a single-sided fiber optic splitter.

FIG. 7 illustrates a 1×2 terminated single-sided splitter and bend assembly 210 in which one 216 of the fibers 214, 216 is terminated, which may be desirable in some applications to avoid optical back reflection. As shown, the fiber ends at a termination 217 where it emerges from the substrate 224. A glue or epoxy termination bond 218 is provided to cover and protect the termination. It is, thus, not necessary to form a miniature bend on the terminated fiber. Alternatively, the fiber may be terminated after it has been folded back upon itself via a miniature bend. In another embodiment, one of the input fibers to the splitter may be terminated.

It will be appreciated that the present invention is applicable to other optical components, such as a planar optic component, a microoptic component, or a bulk optical component, that may utilize a miniature bend. Examples of other optical components include, but are not limited to modulators, isolators, wavelength division multiplexers, and circulators. The invention is not to be limited by what has been particularly shown and described, except as indicated by the appended claims.

We claim:

1. An optical assembly comprising:

a substrate;

an optical component fixedly mounted to the substrate, the component comprising at least two optical fibers each having an entering fiber portion and a return fiber portion, a buffer covering at least a portion of the return fiber portion and the entering fiber portion, the entering fiber portions being fused together in a fusion region to cause a coupling of optical energy between the two optical fibers; and a bend formed in an intermediate portion comprising an optical fiber portion between the entering fiber portion and the return fiber portion of the at least one optical fiber, the intermediate portion having a region with a diameter reduced to less than a diameter of the entering fiber portion and the return fiber portion and capable of transmitting light with substantially less light loss due to bending than an unreduced fiber, the bend providing a reversal of direction between the entering fiber portion and the return fiber portion, and the bend fixedly mounted to the substrate.

2. An optical assembly comprising:

a substrate, a channel formed in the substrate;

an optical component fixedly mounted in the channel of the substrate, the component comprising at least one optical fiber having an entering fiber portion and a return fiber portion, a buffer covering at least a portion of the return fiber portion and the entering fiber portion; and a bend formed in an intermediate portion comprising an optical fiber portion between the entering fiber portion and the return fiber portion of the at least one optical fiber, the intermediate portion having a region with a diameter reduced to less than a diameter of the entering fiber portion and the return fiber portion and capable of transmitting light with substantially less light loss due to bending than an unreduced fiber, the bend providing a reversal of direction between the entering fiber portion and the return fiber portion, and the bend fixedly mounted to the substrate;

wherein the entering fiber portion is fixedly attached to the substrate in a lower portion of the channel and the return fiber portion is fixedly attached to the substrate in the channel above the entering fiber portion.

3. An optical assembly comprising:

a substrate;

an optical component comprising a single-sided fiber optic splitter or coupler fixedly mounted to the substrate, the component further comprising at least one optical fiber having an entering fiber portion and a return fiber portion, a buffer covering at least a portion of the return fiber portion and the entering fiber portion; and a bend formed in an intermediate portion comprising an optical fiber portion between the entering fiber portion and the return fiber portion of the at least one optical fiber, the intermediate portion having a region with a diameter reduced to less than a diameter of the entering fiber portion and the return fiber portion and capable of transmitting light with substantially less light loss due to bending than an unreduced fiber, the bend providing a reversal of direction between the entering fiber portion and the return fiber portion, and the bend fixedly mounted to the substrate.

4. The optical assembly of claim 3, wherein the fiber optic splitter or coupler includes two entering fiber portions and two return fiber portions.

5. The optical assembly of claim 3, wherein the fiber optic splitter or coupler includes two entering fiber portions and one return fiber portion and one terminated fiber portion.

6. An optical assembly comprising:

a substrate;

an optical component fixedly mounted to the substrate, the component comprising at least one optical fiber having an entering fiber portion and a return fiber portion, a buffer covering at least a portion of the return fiber portion and the entering fiber portion, the component comprising a single-sided fiber optic splitter or coupler, a modulator, an isolator, a wavelength division multiplexer, or a circulator; and a bend formed in an intermediate portion comprising an optical fiber portion between the entering fiber portion and the return fiber portion of the at least one optical fiber, the intermediate portion having a region with a diameter reduced to less than a diameter of the entering fiber portion and the return fiber portion and capable of transmitting light with substantially less light loss due to bending than an unreduced fiber, the bend providing a reversal of direction between the entering fiber portion and the return fiber portion, and the bend fixedly mounted to the substrate.

7. The optical assembly of claim 3, wherein the entering portion and the return portion extend from a same side of the substrate.

8. The optical assembly of claim 3, wherein the return fiber portion overlies the entering fiber portion.

9. The optical assembly of claim 3, wherein a channel is formed in the substrate and the fiber optic component is fixedly mounted in the channel.

10. An optical assembly comprising:

a substrate, a channel formed in the substrate;

an optical component fixedly mounted in the channel of the substrate, the component comprising at least one optical fiber having an entering fiber portion and a return fiber portion, a buffer covering at least a portion of the return fiber portion and the entering fiber portion; and a bend formed in an intermediate portion comprising an optical fiber portion between the entering fiber portion and the return fiber portion of the at least one optical fiber, the intermediate portion having a region with a diameter reduced to less than a diameter of the entering fiber portion and the return fiber portion and capable of transmitting light with substantially less light loss due to bending than an unreduced fiber, the bend providing a reversal of direction between the entering fiber portion and the return fiber portion, and the bend fixedly mounted to the substrate;

wherein the entering fiber portion is fixedly attached to the substrate with a bond of glue or epoxy, and the return fiber portion is fixedly attached to the substrate with a bond of glue or epoxy above the bond of entering fiber portion.

11. The optical assembly of claim 3, further comprising a shield formed over the bend, the shield attached to the substrate.

12. The optical assembly of claim 3, further comprising a protective tube formed over the substrate.

13. The optical assembly of claim 3, wherein the bend has a radius of curvature of approximately 0.5 mm.

14. The optical assembly of claim 3, wherein the reversal of direction is approximately 180°.

15. The optical assembly of claim 3, wherein the intermediate portion comprises a bared optical fiber portion.

* * * * *

UNITED STATES PATENT AND TRADEMARK OFFICE
CERTIFICATE OF CORRECTION

PATENT NO. : 6,363,191 B1
DATED : March 26, 2002
INVENTOR(S) : Frederick J. Gillham et al.

It is certified that error appears in the above-identified patent and that said Letters Patent is hereby corrected as shown below:

<u>Column 4,</u>
Line 9, "64," should read -- 64. --.

Signed and Sealed this

Eleventh Day of February, 2003

JAMES E. ROGAN
*Director of the United States Patent and Trademark Office*